(12) United States Patent
Oak

(10) Patent No.: US 6,535,296 B1
(45) Date of Patent: Mar. 18, 2003

(54) FACSIMILE DEVICE FOR PROVIDING A USER-TO-USER SIGNALING FUNCTION AND A METHOD FOR TRANSFERRING AND RECEIVING FACSIMILE DATA BY USING THE SAME

(75) Inventor: Seung-Soo Oak, Kyonggi-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/201,127

(22) Filed: Nov. 30, 1998

(30) Foreign Application Priority Data

Nov. 28, 1997 (KR) .......................................... 97/63641

(51) Int. Cl.⁷ .............................................. G06F 15/00
(52) U.S. Cl. ....................... 358/1.15; 358/402; 358/403; 358/1.16; 358/468; 379/100.08; 379/100.09; 379/100.12; 379/100.13; 379/95.05
(58) Field of Search ............................. 358/1.15, 402, 358/403, 407, 468; 379/100.01, 100.09, 100.12, 100.13, 93.05–93.07

(56) References Cited

U.S. PATENT DOCUMENTS

| | | | | |
|---|---|---|---|---|
| 4,755,992 A | * | 7/1988 | Albal | 370/469 |
| 4,866,703 A | * | 9/1989 | Black et al. | 370/352 |
| 5,008,930 A | * | 4/1991 | Gawrys et al. | 379/265.11 |
| 5,305,318 A | * | 4/1994 | Ozeki et al. | 370/85.7 |
| 5,323,392 A | * | 6/1994 | Ishii et al. | 370/466 |
| 5,418,625 A | * | 5/1995 | Simoosawa | 358/442 |
| 5,483,530 A | * | 1/1996 | Davis et al. | 370/465 |
| 5,530,740 A | * | 6/1996 | Irribarren et al. | 379/89 |
| 5,566,166 A | * | 10/1996 | Lee et al. | 370/32 |
| 5,636,034 A | * | 6/1997 | Ishikawa | 358/434 |
| 5,742,905 A | * | 4/1998 | Pepe et al. | 455/461 |
| 5,754,627 A | * | 5/1998 | Butler et al. | 455/414 |
| 5,757,511 A | * | 5/1998 | Kaneyama | 358/403 |
| 5,761,282 A | * | 6/1998 | Hsu | 379/100.05 |
| 5,815,505 A | * | 9/1998 | Mills | 370/522 |
| 5,848,137 A | * | 12/1998 | Hsiao | 379/110.01 |
| 5,850,594 A | * | 12/1998 | Cannon et al. | 455/313 |
| 5,872,926 A | * | 2/1999 | Levac et al. | 395/200.36 |
| 5,943,138 A | * | 8/1999 | Fujiki | 358/407 |
| 5,974,300 A | * | 10/1999 | LaPorta et al. | 455/31.2 |
| 6,130,934 A | * | 10/2000 | Meek et al. | 379/100.09 |
| 6,157,706 A | * | 12/2000 | Rachelson | 379/100.08 |
| 6,182,118 B1 | * | 1/2001 | Finney et al. | 709/206 |

OTHER PUBLICATIONS

The Communication Handbook, 1997, Jerry Gibson, CRC Press, IEEE Press, pp. 579–581.*

* cited by examiner

Primary Examiner—Edward Coles
Assistant Examiner—Tia A. Carter
(74) Attorney, Agent, or Firm—Robert E. Bushnell, Esq.

(57) ABSTRACT

A facsimile device includes a device capable of transferring and receiving a message in a user-to-user signaling manner and an S-type interface card which is connected to an integrated service digital network (ISDN). According to the present invention, the facsimile device transfers and receives messages through a D channel to be used for transferring signals in the user-to-user signaling manner even though the facsimile device communicates with another facsimile device through B channels of the ISDN to transfer and receive data. Accordingly, channels provided to the facsimile device can be efficiently used.

22 Claims, 7 Drawing Sheets

FACSIMILE DEVICE FOR PROVIDING A USER-TO-USER SIGNALING FUNCTION AND A METHOD FOR TRANSFERRING AND RECEIVING FACSIMILE DATA BY USING THE SAME

CLAIM OF PRIORITY

This application makes reference to, incorporates the same herein, and claims all benefits accruing under 35 U.S.C. §119 from an application for a FACSIMILE DEVICE FOR PROVIDING A USER-TO-USER SIGNALING FUNCTION AND A METHOD FOR TRANSFERRING AND RECEIVING FACSIMILE DATA BY USING THE SAME earlier filed in the Korean Industrial Property Office on the Nov. 28, 1997 and there duly assigned Ser. No. 63641/1997.

BACKGROUND OF THE INVENTION

1. Technical Field

The present invention relates to a facsimile device and, more particularly, to a facsimile device which provides a user-to-user signaling function, and which has an S-type interface card, and a method for transferring and receiving facsimile data by using the facsimile device.

2. Related Art

Generally, as is well known, a facsimile device includes a scanner for scanning a document, a printer for printing image data, and a device for transferring and receiving the image data to/from another remote facsimile device.

An analog type of facsimile device is connected to an integrated service digital network (hereinafter, referred to as ISDN) by means of a terminal adapter. However, the terminal adapter only converts digital signals transferred from the ISDN into analog signals to provide the facsimile device with the analog signals, and converts the analog signals transferred from the facsimile device into digital signals to provide the ISDN with the digital signals. Therefore, the analog type of facsimile device cannot be provided with additional service supported through the ISDN.

The additional service of the ISDN can be utilized by the facsimile device if and when the facsimile device has the ability to analyze a class-3 message from the ISDN. Even if the analog type facsimile device is connected to the ISDN through the terminal adapter, the facsimile device cannot be supplied with the additional service corresponding to the class-3 message because the terminal adapter only converts signals in a voice band into digital signals.

That is, when the analog type facsimile device is connected to the ISDN through the terminal adapter, the analog facsimile device communicates with other facsimile devices through the ISDN by using the voice band. Therefore, the analog facsimile device must have a terminal adapter which functions to receive the additional services from the ISDN, or must have a specified communication instrument between the terminal adapter and the facsimile device itself.

For example, RS-232C type serial ports are provided for the terminal adapter and the analog facsimile device, respectively. Software is also provided for the terminal adapter and the analog facsimile device.

The terminal adapter analyzes the class-3 message from the ISDN, and informs the analog facsimile device of the additional services which are able to be used in the facsimile device. The analog facsimile device informs the terminal adapter of what kind of additional ISDN service is to be used by the facsimile device.

The analog facsimile device must also include a display device, such as a liquid crystal display, to provide the user with the additional services. Moreover, the analog facsimile device must also include function keys to select one of the additional services.

SUMMARY OF THE INVENTION

The present invention has been made to overcome the above described problems.

It is an object of the present invention to provide a facsimile device having a user-to-user signaling function, and which contains an S-type interface card, and to provide a method for transferring and receiving a message in a user-to-user manner.

To accomplish the above objects of the present invention, according to one aspect of the present invention, there is provided a facsimile device which includes a device capable of transferring and receiving a message in a user-to-user signaling manner, and which has an S-type interface card which is able to be connected to an integrated service digital network. The message transferring and receiving device includes: an input section for inputting a message to be transferred; a storage section for storing the inputted message; a transferring section for transferring the stored message in the user-to-user signaling manner; a receiving section for receiving a transferred message; an output section for outputting the received message; and a controller for detecting input signals from every section, and for generating a control signal corresponding to the each input signal.

The input section and the output section are, preferably, formed on a single panel.

According to another aspect of the present invention, there is provided a method for transferring and receiving a message by using a facsimile device having an S-type interface card, comprising the steps of: inputting a message to be transferred; transferring the inputted message in a user-to-user signaling manner; and receiving a transferred message in the user-to-user signaling manner.

A method for transferring and receiving a message by using a facsimile device having an S-type interface card further comprises the step, after the step of inputting a message to be transferred, of storing the message to be transferred, after which the stored massage is transferred.

The message inputting step includes the steps of: indicating a list of the messages which are stored; and selecting one of the messages from the list.

The message receiving step includes the steps of: outputting a received message on a display; determining whether or not to print the received message; and printing the received message when an order to print the received message is inputted.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Hereinafter, a facsimile device and a method for transferring and receiving a message in a user-to-user signaling manner according to the present invention will be described in detail with reference to accompanying drawings.

The user-to-user signaling (hereinafter, referred to as UUS) is one of the additional services provided by the ISDN, and is a function by which the facsimile device transfers a brief message to and receives a brief message from another facsimile device by using a D channel as a channel for signals, while the user transfers and receives voice data and image data to/from the other facsimile device by using a B channel or B channels of the ISDN.

The UUS function is generally divided into a transferring function for transferring a call setup message carrying a user's message, a transferring function for transferring a separate user's message while treating the call setup message, and a transferring function for transferring the user's message in a state in which the facsimile device is connected to the other facsimile device.

As described above, the user's message is added to a class-3 message as a message for controlling a call signal, and is transferred to and received from the other facsimile device. On the other hand, only the user's message may be transferred to and received from the other facsimile device. Transferring and receiving messages between users is provided under Rule Q.931 of the ITU-T.

Figure 1:
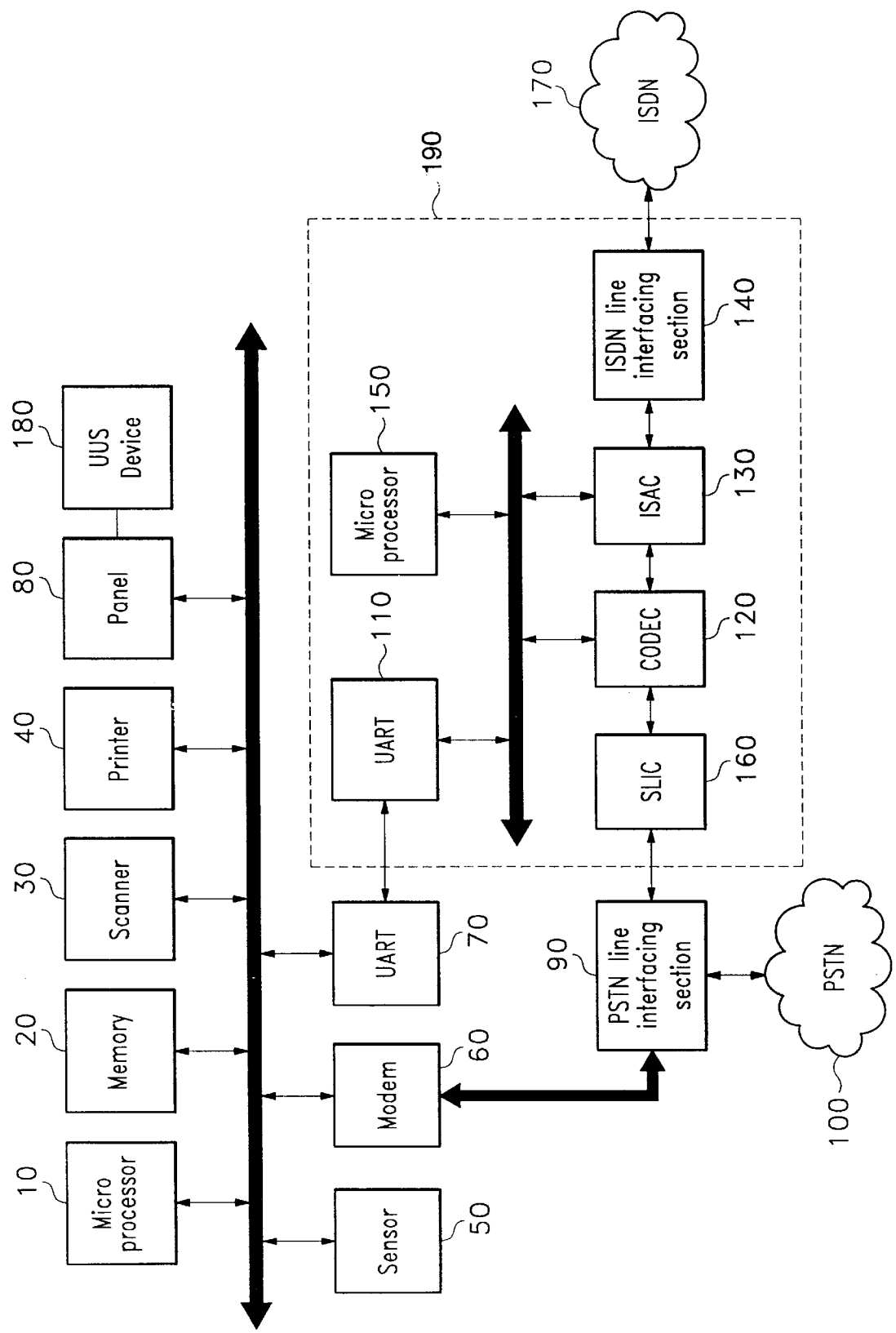
FIG. 1 is a schematic block diagram showing a facsimile device having an S-type interface card which is connected to an integrated service digital network according to the invention.

FIG. 1 is a schematic block diagram showing a facsimile device having an S-type interface card which is connected to an integrated service digital network according to the present invention.

As shown in FIG. 1, a micro processor 10 controls all sections of the facsimile device according to a control program. A memory 20 stores program data, protocol data, character data, and data relating to a transmission and a reception. The micro processor 10 accesses and stores the data in the memory 20. A panel section 80 includes a plurality of keys to generate key data, a display device for inputting the key data into the micro processor 10 when the key data are generated, and for displaying the data from the micro processor 10, and a UUS device 180 for performing the UUS function.

A scanner 30 scans a document and converts the document data into digital image data. Then, the scanner 30 provides the image data to the micro processor 10.

A modem 60 is controlled by the micro processor 10, and modulates output data into an analog signal. The modem 60 also demodulates analog input signals into digital data.

A printer 40 prints received facsimile data according to a control signal from the micro processor 10. A sensor 50 detects the amount of recording paper which remains in a tray or detects a document, and provides information as to the amount of remaining recording paper and information as to the document to the micro processor 10. UARTs 70 and 110 analyze information on a D channel of the ISDN 170, and then transfer and receive controlling information and a message. A CODEC 120 converts an analog signal into a digital signal which is pulse code modulated.

An ISAC 130 performs line coding and line activating/inactivating functions as the class-1 functions of the ISDN 170 to control the D channel, and performs a line access procedure on the D channel as a class-2 function. The ISAC 130 also transfers data to and receives data from an SLIC 160 so as to transfer image data to the other facsimile device through the ISDN 170.

An ISDN line interfacing section 140 interfaces signals between the facsimile device and the ISDN 170. The SLIC 160 connects a terminal for digital signals to a terminal for analog signals, and interfaces the digital signals and the analog signals between the terminals.

A PSTN (public switched telephone network) line interfacing section 90 interfaces signals from the PSTN 100 with signals from the ISDN 170. An S-type interface card 190 includes the UART 110, a micro processor 150, the SLIC 160, the CODEC 120, the ISAC 130, and the ISDN line interfacing section 140.

Figure 2:
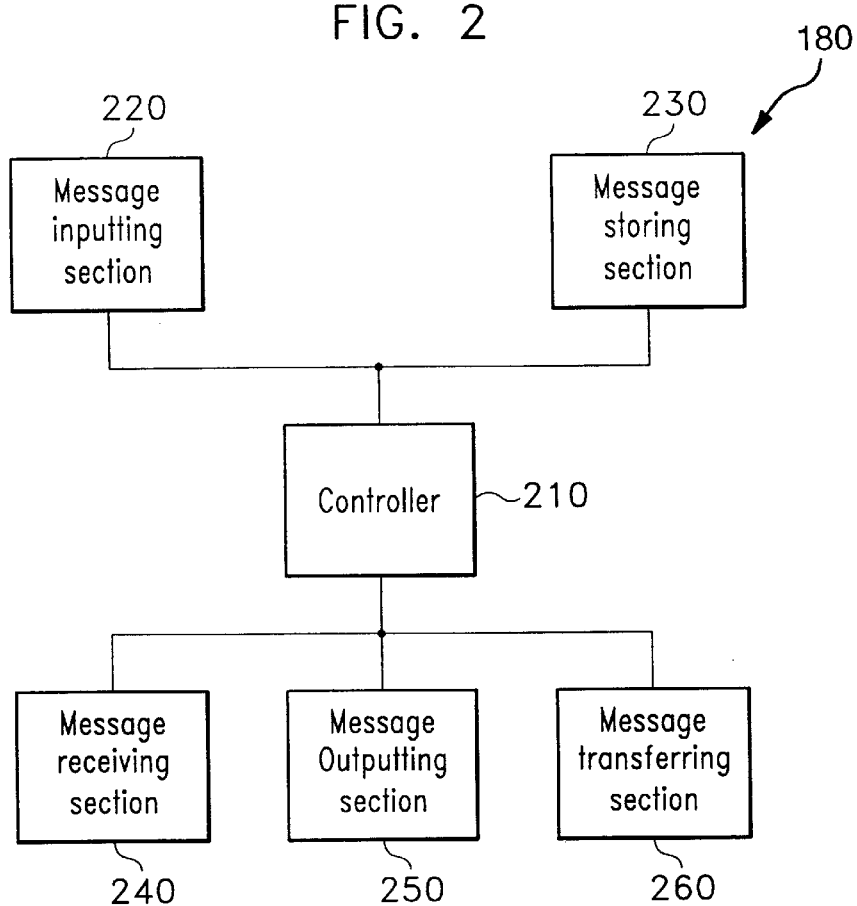
FIG. 2 is a block diagram showing the construction of a user-to-user signaling device according to the present invention.
Figure 3:
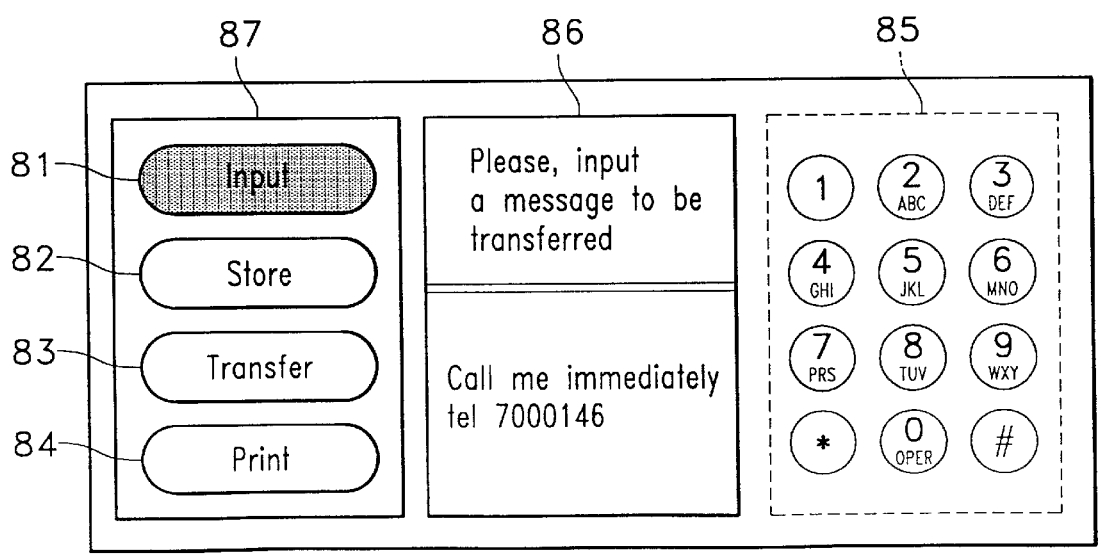
FIG. 3 is a view showing an operation panel of the facsimile device in which a key for inputting a message is selected according to the present invention.
Figure 4:
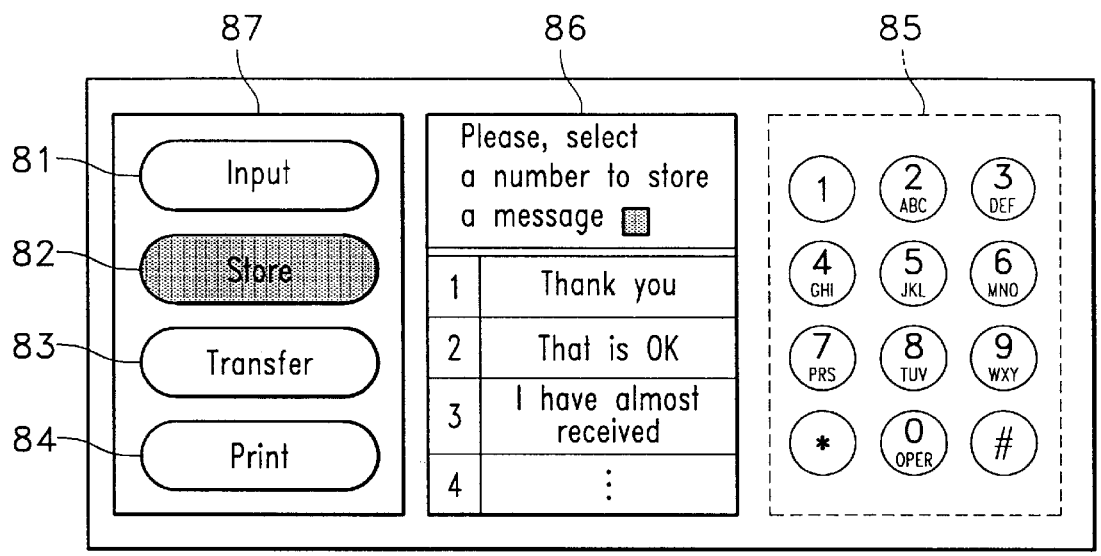
FIG. 4 is a view showing the operation panel of the facsimile device in which a key for storing the message is selected according to the present invention.
Figure 5:
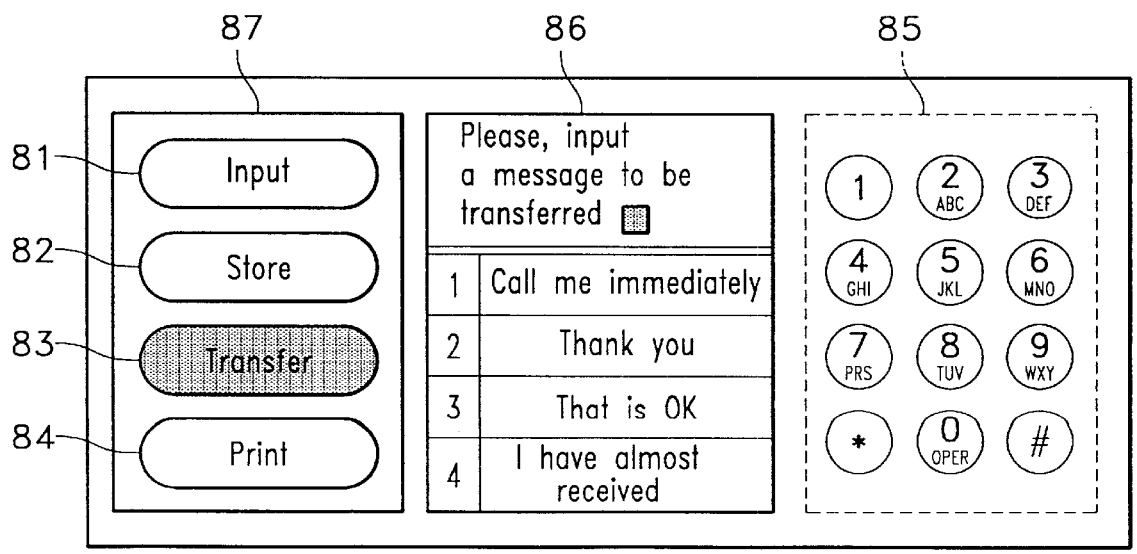
FIG. 5 is a view showing the operation panel of the facsimile device in which a key for transferring the message is selected according to the present invention.
Figure 6:
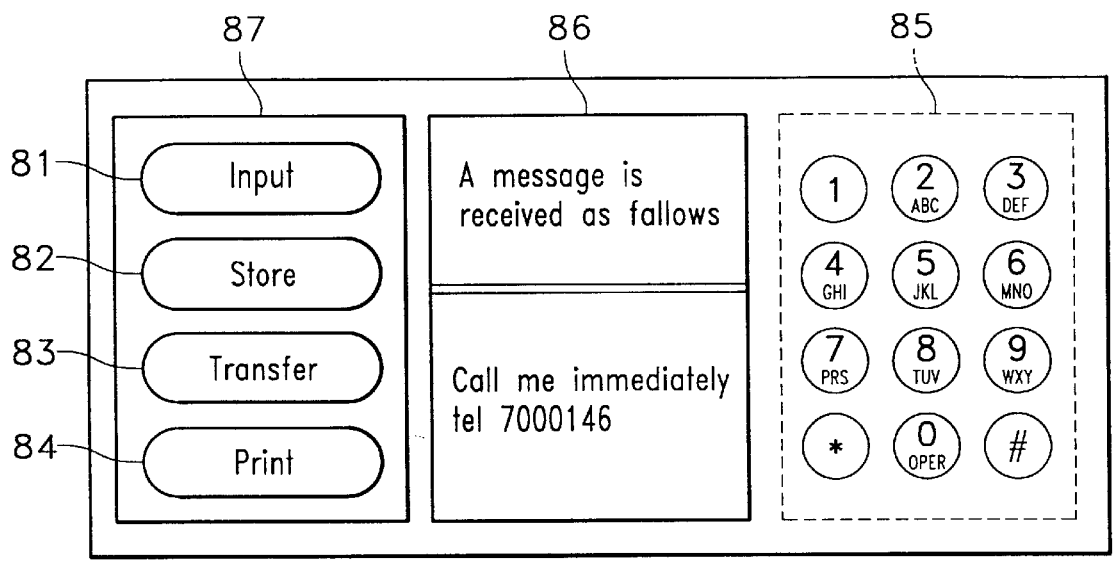
FIG. 6 is a view showing the operation panel of the facsimile device when a message is received by the facsimile device according to the present invention.
Figure 7:
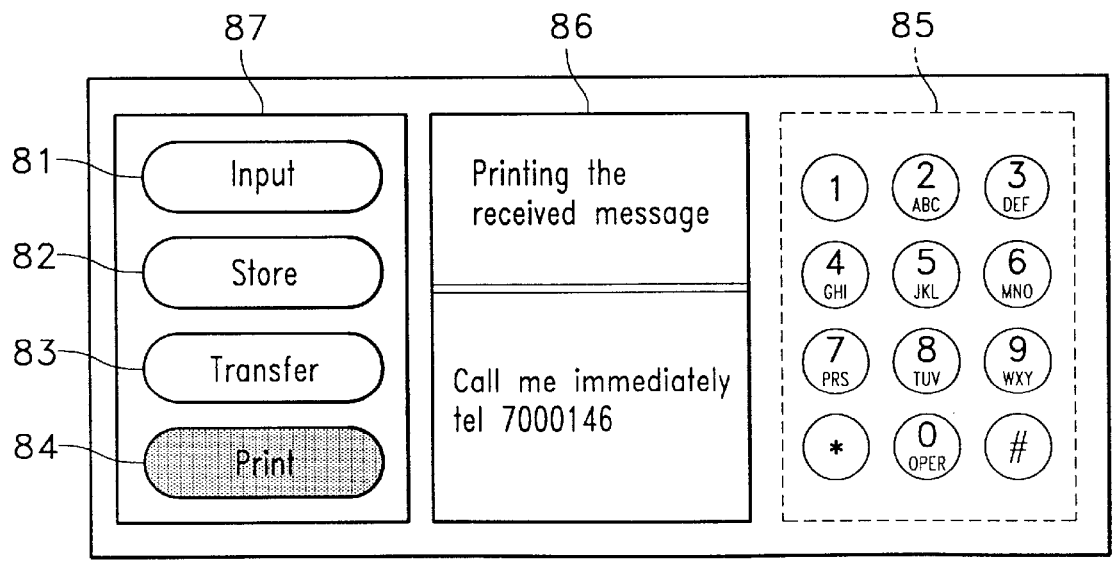
FIG. 7 is a view showing the operation panel of the facsimile device in which a key for printing the message is selected according to the present invention.

FIG. 2 is a block diagram showing the construction of the UUS device 180 of FIG. 1 according to the present invention. FIGS. 3 to 7 are views showing the operation panel of the facsimile device in different states according to the present invention.

As shown in FIGS. 2–7, the UUS device 180 includes a message inputting section 220 which includes a key 81 used for inputting a message to be transferred in a UUS manner, a message storing section 230 which includes a key 82 used for storing the inputted message, a message transferring section 260 which includes a key 83 used for transferring the stored message in the UUS manner, a message receiving section 240 for receiving a message and for displaying the received message on a liquid crystal display 86 (FIG. 3), a message outputting section 250 which includes a key 84 used for outputting the received message, and a controller 210 for controlling the above sections.

Hereinafter, the operation of the facsimile device according to the present invention will be described in detail with reference to FIGS. 2 to 9.

Transferring the message in the UUS manner will be described with respect to a transferring function for transferring the message in a state wherein the facsimile device is connected to another facsimile device.

Most facsimile devices have a plurality of keys used for inputting numbers and characters, and several function keys used for selecting one of various functions thereof. Therefore, the user can input characters into the facsimile device by using the keys.

Figure 8:
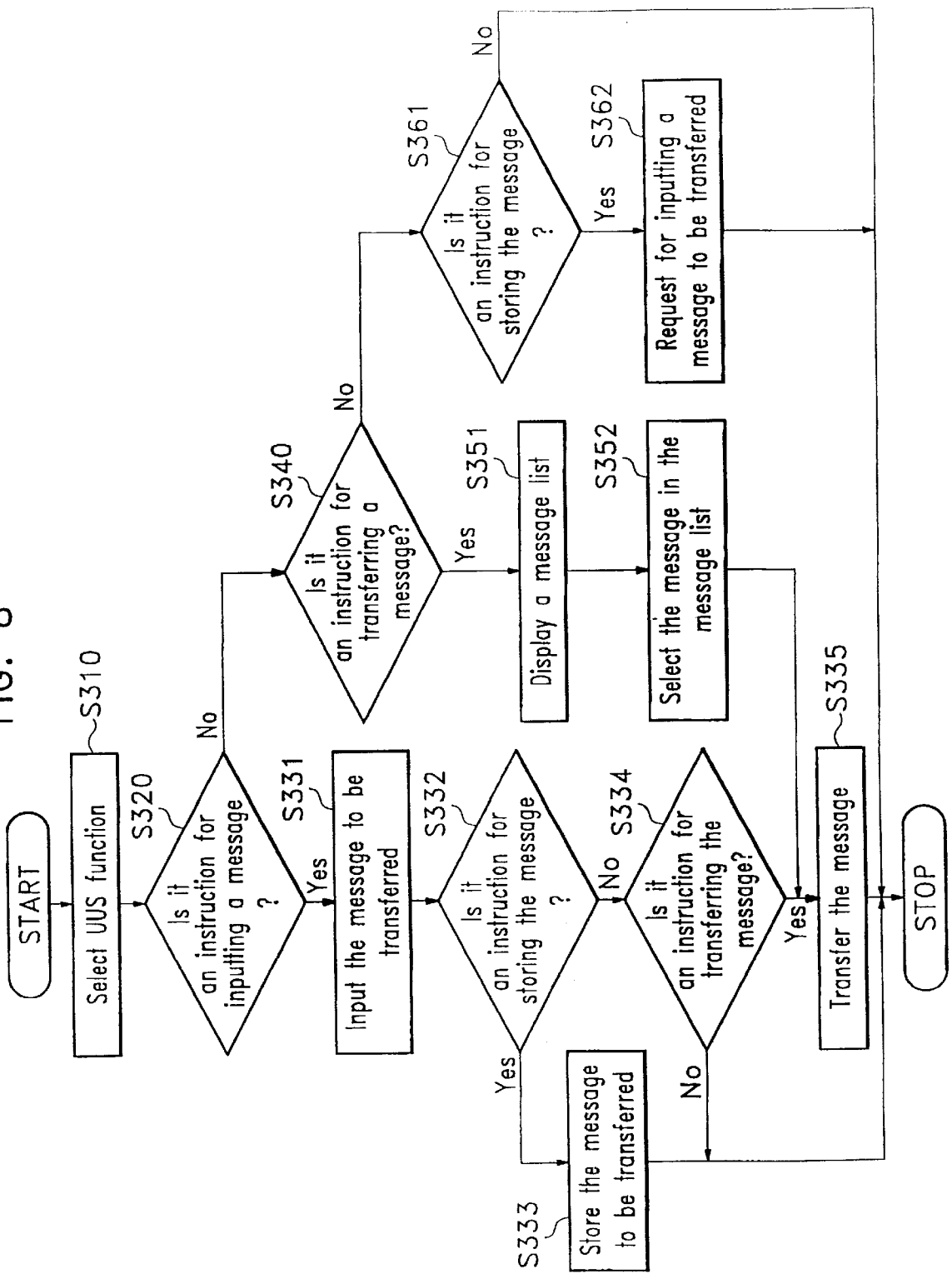
FIG. 8 is a flow chart showing a process of storing and transferring the inputted message according to the present invention.

FIG. 8 is a flow chart showing a process of storing and transferring the inputted message according to the present invention.

At step S310, a specific function is selected. It is determined whether the selected function is an instruction for inputting a message at step S320. If the selected function is not an instruction for inputting a message, it is determined whether the selected function is an instruction for transferring a message at step S340. If the selected function is not an instruction for transferring a message, it is determined whether the selected function is an instruction for storing a message at step S361.

If step S320 determines that the selected function is an instruction for inputting a message (see FIG. 3), the message to be transferred is inputted into the liquid crystal display 86 by using the keys 85 for inputting the numeric and character data at step S331 (FIG. 8). Then, it is determined whether an instruction for storing the message is inputted (see FIG. 4) at step S332 (FIG. 8).

If the instruction for storing the message is not inputted, it is determined whether an instruction for transferring the message is inputted (see FIG. 5) at step S334 (FIG. 8). When the instruction for transferring the message is inputted, the message is transferred to the other facsimile device at step S335.

On the other hand, if the selected function is an instruction for transferring a message (step S340), a message list stored in the message storing section 230 (FIG. 2) is displayed on display device 86 (FIG. 3),such as a liquid crystal display, at step S351 (FIG. 8). Then, a message is selected from the message list, which is displayed on the display device 86, at step S352. At step S355, the selected message as displayed on the display device 86 is transferred to the other facsimile device.

If the selected function is an instruction for storing a message (step S361), a request for inputting a message to be transferred is displayed on the liquid crystal display 86 (FIG. 4) at step S362 (FIG. 8).

As described above, in the facsimile device having an S-type interface card so as to be connected to the ISDN according to the present invention, since a message can be transferred to and received from another remote facsimile device in the UUS manner, the channels are effectively used for transferring and receiving the image data.

Figure 9:
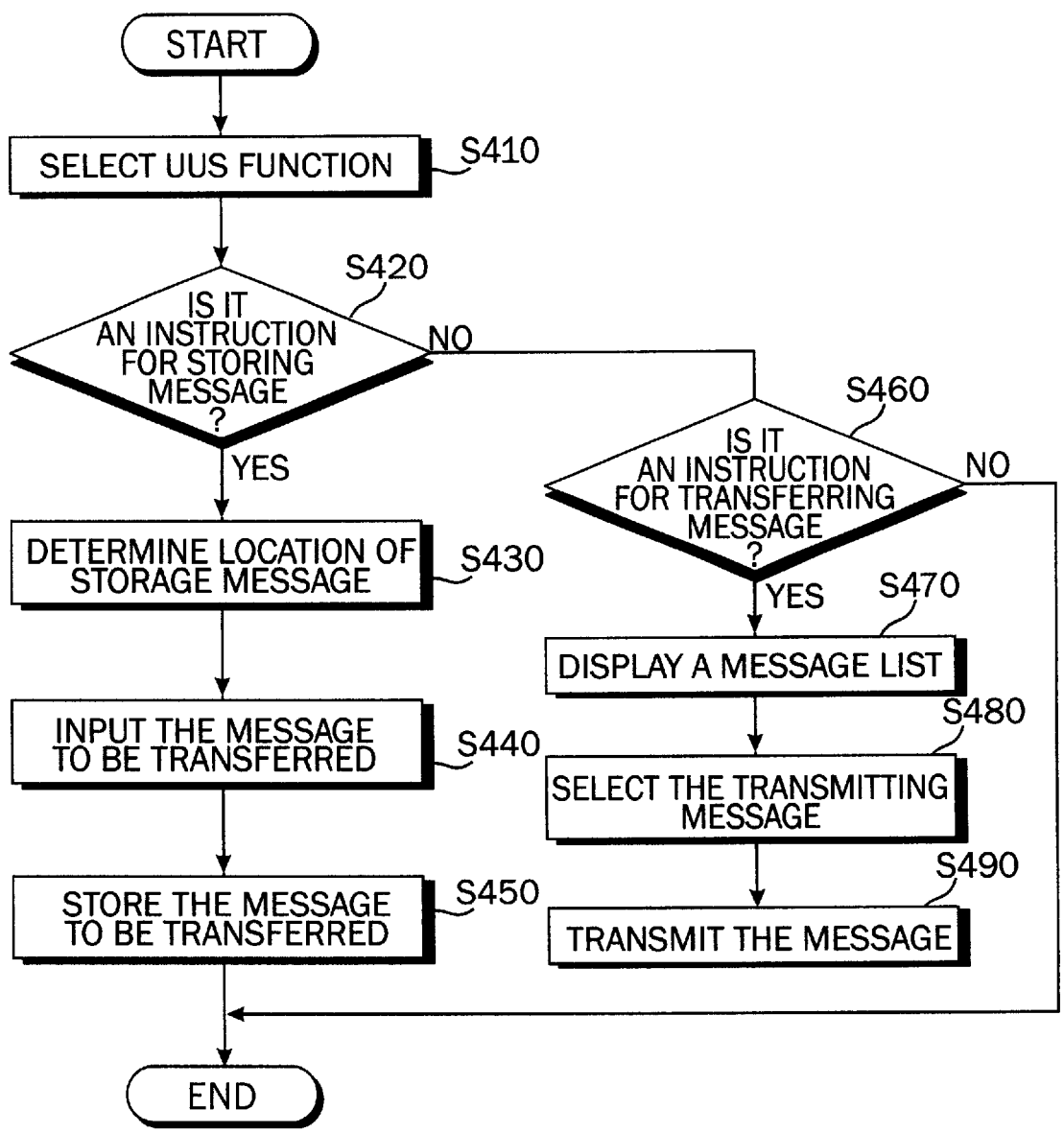
FIG. 9 is a flow chart of an alterative process of storing and transferring inputted message.

FIG. 9 is a flow chart of an alterative process of storing and transferring inputted message. The process of FIG. 9 is similar to, and is a refined version of, the process of FIG. 8. In particular, the process of FIG. 9 is similar to that of FIG. 8 except that: (1) the decision block S332 of FIG. 8 and operation block S333 are deleted in FIG. 9; (2) operation block S335 of FIG. 8 is deleted in FIG. 9; (3) operation block of S490 has been added to FIG. 9; and (4) decision block S361 and operation block S362 of FIG. 8 are deleted in FIG. 9.

Figure 10:
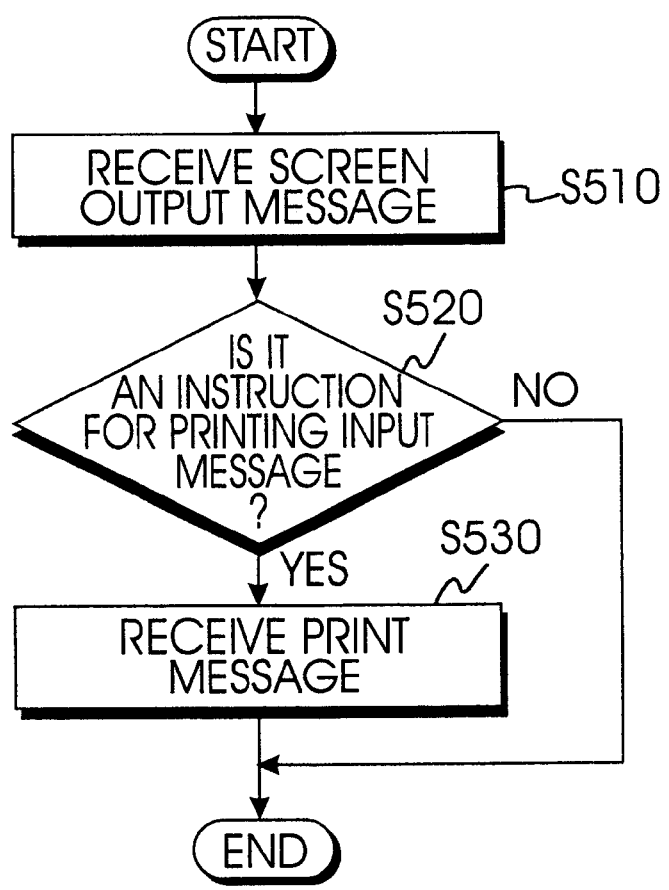
FIG. 10 is a flow chart showing a process of receiving and printing the message according to the present invention.

FIG. 10 is a flow chart showing a process of receiving and printing the message according to the present invention. In operation, a received message is outputted on display device 86 (FIG. 7) in step S510 (FIG. 10). A determination as to whether there is an instructions for printing the input message in step S520. If so, the received message is printed (step S560); if not, the process is ended.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. In a facsimile device which includes a device for transferring and receiving a message in a user-to-user signaling manner and which includes an S-type interface card for connection to an integrated service digital network (ISDN) having a D channel, the improvement wherein the message transferring and receiving device includes:

an input section for inputting a message to be transferred;

a storage section for storing the inputted message;

a transferring section for transferring the stored message in the user-to-user signaling manner using the D channel of the ISDN;

a receiving section for receiving a transferred message;

an output section for outputting tie received message; and a controller for detecting input signals from the input, storage, transferring, receiving and output sections, and for generating a control signal corresponding to each of said input signals.

2. In the facsimile device as claimed in claim 1, wherein the input section and the output section are formed on a single panel.

3. In the facsimile device as claimed in claim 1, wherein said message transferring and receiving device further comprises user-operated control keys for selecting input, storage and transfer functions to actuate said input, storage and transferring sections.

4. In the facsimile device as claimed in claim 3, wherein said message transferring and receiving device further comprises a print control key for selecting a print function to actuate said output section to drive a printer of said facsimile device to print out the received message.

5. In the facsimile device as claimed in claim 1, wherein said message transferring and receiving device further comprises a display window for displaying control messages prompting a user to enter needed control data, and for displaying a list of previously inputted messages for user review and selection of a desired message to be transferred.

6. A method for transferring and receiving a message over an integrated service digital network (ISDN) having a D channel by using a facsimile device having an S-type interface card, comprising the steps of:

inputting a message to be transferred;

transferring the inputted message in a user-to-user manner over the D channel of the ISDN; and receiving a transferred message in the user-to-user manner over the D chancel of the ISDN.

7. The method as claimed in claim 6, further comprising the step, after the inputting step, of storing the message to be transferred, wherein the stored message is transferred during the transferring step.

8. The method as claimed in claim 7, wherein the inputting step includes the steps of:

indicating a list of the messages which are stored; and selecting one of the messages from the list for transfer during the transferring step.

9. The method as claimed in claim 6, wherein the receiving step includes the steps of:

outputting the received message on a display;

determining whether or not to print the received message; and printing the received message when an order to print the received message is inputted.

10. A facsimile device comprising first means for transferring and receiving messages in a user-to-user signaling manner over an integrated service digital network (ISDN) having a D channel and second means for connecting the facsimile device to the ISDN, wherein said first means comprises:

an input section for inputting a message to be transferred;

a storage section for storing the inputted message;

a transferring section for transferring the stored message in the user-to-user signaling manner over the D channel of the ISDN;

a receiving section for receiving a transferred message over the D channel of the ISDN; and an output section for outputting the received message.

11. The facsimile device as claimed in claim 10, wherein said first means further comprises a controller for detecting input signals from the input, storage, transferring, receiving and output sections, and for generating a control signal corresponding to each respective one of the input signals.

12. The facsimile device as claimed in claim 10, wherein the input section and the output section are formed on a single panel.

13. The facsimile device as claimed in claim 10, wherein said first means comprises user-operated control keys for selecting input storage and transfer functions to actuate sad input, storage and transferring sections.

14. The facsimile device as claimed in claim 13, wherein said first means further comprises a print control key for selecting a print function to actuate said output section to drive a printer of said facsimile device to print out the received message.

15. The facsimile device as claimed in claim 10, wherein said first means further comprises a display window for displaying control messages prompting a user to enter needed control data, and for displaying a list of previously inputted messages for user review and selection of a desired message to be transferred.

16. An apparatus for transferring and receiving a message by using a facsimile device connected to an integrated service digital network (ISDN), said apparatus comprising:

input means for inputting a message to be transferred;

transfer means for transferring the inputted message in a user-to-user manner over the D channel of the ISDN; and receiving means for receiving a transferred message in the user-to-user or over the D channel of the ISDN.

17. The apparatus as claimed in claim 16, further comprising storage means for storing the message to be transferred after the inputting of the message to be transferred, wherein the stored massage is transferred.

18. The apparatus as claimed in claim 17, wherein said input means displays a list of messages which are stored so that a user can select one of the messages for transfer.

19. The apparatus as claimed in claim 16, wherein said receiving means outputs the received message on a display, determines whether or not to print the received message, and prints the received message in response to an order to print the received message from a user.

20. The apparatus as claimed in claim 17, further comprising user-operated control keys for selecting input, storage and transfer functions to actuate said input, storage and transfer means.

21. The apparatus as claimed in claim 16, further comprising a print control key for selecting a print function to actuate said receiving means to drive a printer of said facsimile device to print out the received message.

22. The apparatus as claimed in claim 16, further comprising a display window for displaying control messages prompting a user to enter needed control data, and for displaying a list of previously inputted messages for user review and selection of a desired message to be transferred.

* * * * *